United States Patent [19]

Cassini et al.

[11] Patent Number: 4,580,983
[45] Date of Patent: Apr. 8, 1986

[54] STAND DEVICE FOR HOLDING A BICYCLE STATIONARY WHILE SIMULATING ROAD RUNNING CONDITIONS

[75] Inventors: Germano Cassini, Mantova; Francesco Grassi, Curtatone; Roberto Prevedelli, Goito, all of Italy

[73] Assignee: C.I.M. Costruzioni Industriali Metalliche S.n.c. di Germano Cassini & C., Goito MN, Italy

[21] Appl. No.: 593,067

[22] Filed: Mar. 23, 1984

[51] Int. Cl.⁴ .......................... G09B 9/04; A63B 69/16
[52] U.S. Cl. .......................................... 434/61; 272/73; 280/293
[58] Field of Search .................. 434/61; 280/293, 295, 280/296; 272/73

[56] References Cited

U.S. PATENT DOCUMENTS

| 560,061 | 5/1896 | Fox | 272/73 |
| 2,788,211 | 4/1957 | Ivanoff | 272/73 |
| 3,686,776 | 8/1972 | Dahl | 434/61 |
| 4,082,265 | 4/1978 | Berkes | 280/293 X |

FOREIGN PATENT DOCUMENTS

| 16921 | of 1905 | United Kingdom | 434/67 |
| 1577866 | 10/1980 | United Kingdom | 434/61 |

Primary Examiner—William H. Grieb
Attorney, Agent, or Firm—Guido Modiano; Albert Josif

[57] ABSTRACT

The involved technical field is that of bicycles, and the invention is concerned with a stand device for holding a bicycle stationary while simulating road running conditions. The technical problem was that of providing a device which could simulate road running conditions with a high degree of verisimilitude and the solution resides in a structure comprising two supporting rollers, one for each wheel, which are kinematically connected to each other and to a fan, adapted to generate a flow of air blowing against the bicycle, the bicycle being supported on means adapted to heel and move sideways.

1 Claim, 1 Drawing Figure

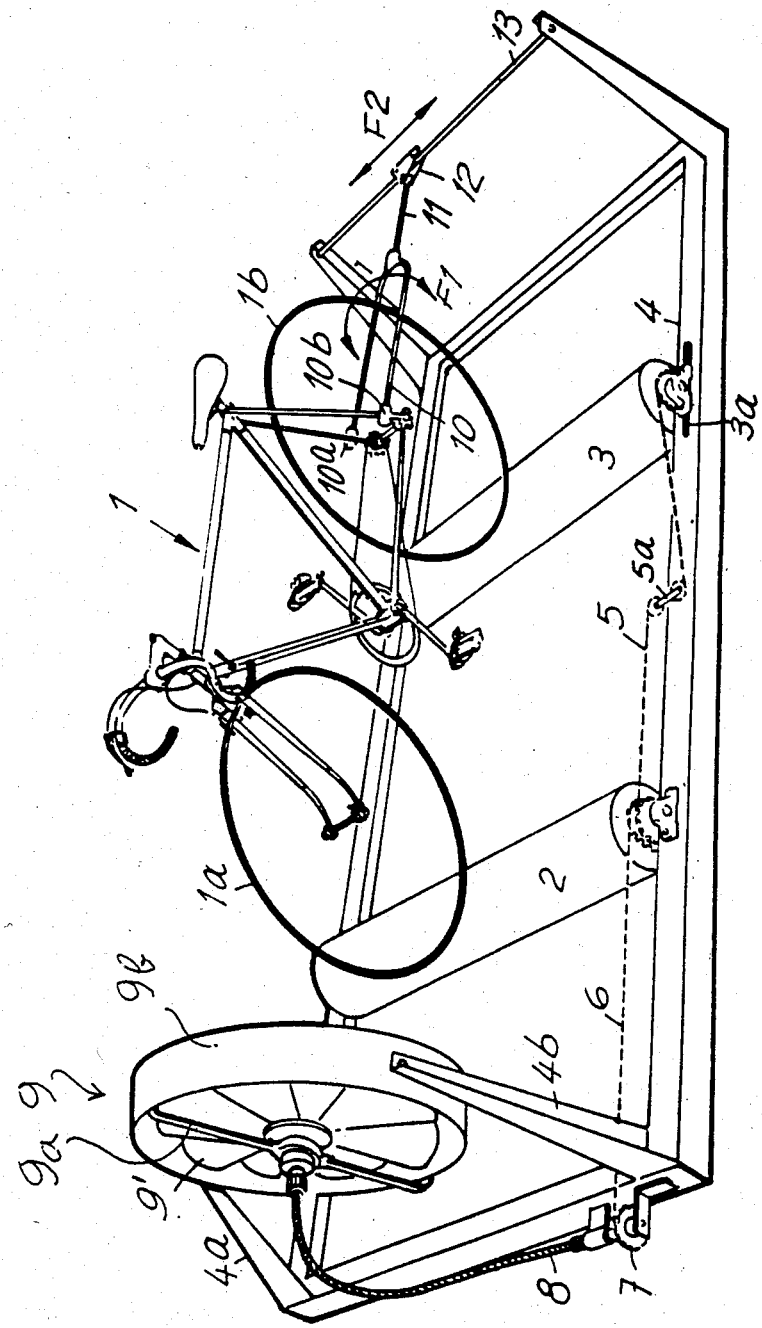

STAND DEVICE FOR HOLDING A BICYCLE STATIONARY WHILE SIMULATING ROAD RUNNING CONDITIONS

This invention relates to a stand device for holding a bicycle stationary while simulating road running conditions.

As is known, widely employed are stand devices which can hold a bicycle stationary and allow a person riding it to pedal, they being used both by bicycle racers for indoors training purposes and by anyone who may simply wish to take some exercise.

Prior pedalling stands usually include two rotatably supported rollers coupled together to provide support for the rear wheel of a bicycle, which is known to be the drive wheel, thereby on pedalling the wheel will cause the rollers to turn and the bicycle can be kept upright owing to gyroscopic effect.

The above-described prior device cannot, however, faithfully reproduce the real rod running conditions of a bicycle, first because the rear wheel is supported from two areas, which are the areas of tangency to the coupled rollers, instead of one as in actual road travelling, and because the front wheel is left stationary, differently from what would occur on the road; furthermore, the cyclist is not allowed to move transversely and deviate somewhat from a truly vertical stance as is often done in normal conditions of use of a bicycle. The unreal feeling of the exercise is further enhanced by the still air environment.

SUMMARY OF THE INVENTION

It is an object of this invention to provide a stand device for holding a bicycle stationary, which can simulate road travelling conditions with a high degree of verisimilitude so as to afford an exercise for the user which is profitable from the functional standpoint and performed in a comfortable environment from a psychological point of view.

It is another object of this invention to provide such a device, which can be quite simple constructionwise, and ensure low cost and the utmost reliability, while being readily adaptable to any size bicycles.

These objects are achieved by a stand device for holding a bicycle stationary while simulating road running conditions, according to the invention, characterized in that it comprises, carried on a floor resting structure, two supporting rollers, one for each wheel of the bicycle, kinematically connected to each other and to a fan operative to blow a flow of air against the front portion of the bicycle, means being also provided for so supporting the bicycle as to allow it to undergo movements in the transverse direction and limited deviations from vertical.

BRIEF DESCRIPTION OF THE DRAWINGS

Further features and advantages of the invention will be more readily apparent from the following description of a preferred, though not exclusive, embodiment thereof, as illustrated by way of example and not of limitation in the accompanying drawing, the one FIGURE whereof shows a perspective view of the invention.

DESCRIPTION OF THE PREFERRED EMBODIMENTS

With reference to the drawing FIGURE, indicated at 1 is a bicycle arranged to bear with its front wheel 1a on the roller 2, and with its rear wheel 1b on the roller 3. Said rollers or supporting rollers, which are carried on the floor resting structure 4, are connected kinematically together by a drive chain 5 with a 1:1 drive ratio, thereby they will turn at the same speed, and have sufficient inertia to keep turning for an appreciable time after pedalling is discontinued. Thus, the gyroscopic efffect of the bicycle wheel is maintained, thus enabling the bicycle be to maintained in an upright position.

The roller 3 may be secured at different locations on the structure 4 by virtue of its supports being slidable along slots, such as 3a, thereby the stand can be adapted to accommodate different size bicycles. A chain tensioner 5a keeps the chain 5 tensioned at any positions of the roller 3.

From the shaft of the roller 2, the drive chain 6 derives the motion for a pinion sprocket 7 at the end of a flexible cable 8 which transmits the motion to a fan 9 carried on uprights 4a and 4b of the structure 4 with its blades facing the front portion of the bicycle. As visible from the drawing the fan 9 has an impeller 9' mounted for rotation on the bracket 9a of the frame 9b supported on the upright 46.

The bicycle supporting or holding means which are of yieldable type allowing the bicycle to move in a transverse direction and heel somewhat, whilst maintaining the wheels of the bicycle in tangential communication with the supporting rollers 2,3 comprise a fork 10, having clamps 10a and 10b for attachment to the frame tubes of the bicycle, said fork being connected for rotation according to the arrow F1 to a small rod 11 extending from a slider 12 associated with a crosswise slideway 13 for translation therealong in the direction of the arrow F2.

It may be appreciated from the foregoing description that the device of this invention can very closely simulate conditions actually experienced during rod travelling. In fact, the two wheels of the bicycle are both kept moving and each of them rests at a single location, exactly simulating road travelling conditions, furthermore the user is swept during the exercise by an air flow which increases proportionally with the pedalling rate.

Approximation to real road running is further enhaced by the bicycle supporting means enabling the user to move sideways and heel, thus affording the possibility of introducing variety in the exercise as may be useful for a proper psychological attitude. This effect may be intensified by the provision of a screen adapted to show to the user relaxing representations.

The invention as disclosed is susceptible to many modifications and variations without departing from the true scope of this inventive idea. Thus, as an example, the fan may be located close to the base of the floor resting structure, so as to be driven through a simplified kinematic train, in which case its delivery end will include an air duct directing the air flow against the front of the bicycle; moreover, said fan may be driven by an electric motor with a rheostat connected to the pedal movements, or by a hydraulic motor operated through a pump connected to the pedals. The rollers supporting the bicycle wheels may be provided with some means of changing rolling resistance, thus providing a range of operating conditions for the device.

It is also contemplated that the floor resting structure may comprise several modules assembled together in any desired manner, so that space requirements can be reduced by disassembling the device when not used.

In practicing the invention, all of the details may be replaced with other, technically equivalent, elements; any materials shapes and dimensions, selected contingent on individual requirements.

We claim:

1. An apparatus for holding a bicycle stationary while simulating road running conditions, said apparatus comprising a floor resting structure having a longitudinal and a widthwise extension, a supporting front roller for the front wheel of the bicycle and longitudinally at a distance therefrom a supporting rear roller for the rear wheel of the bicycle, said front roller and said rear roller being substantially parallel to each other and mounted for rotation on said floor resting structure, a fan on said floor resting structure and holding means for yieldably holding the bicycle in position on said rollers, wherein said fan comprises a frame portion mounted on said supporting structure and an impeller mounted for rotation on said frame and wherein the apparatus further comprises transmission means between said front roller and said rear roller, said transmission means having a section transmissively connected with said impeller, thereby to transmit rotatory motion to said impeller when rotation is imparted by the bicycle user to said rear roller through the rear wheel of the bicycle, and wherein said holding means for yieldably holding the bicycle in position comprise a slideway extending transverse to said longitudinal extension and supported by said floor resting structure, a slider slidable on said slideway, a rod member connected with said slider and having a longitudinal axis extending in said longitudinal direction, a fork connected with said rod member for rotation about said longitudinal axis, said fork having clamps for attachment to the bicycle frame.

* * * * *